United States Patent [19]
Caron

[11] Patent Number: 5,378,277
[45] Date of Patent: Jan. 3, 1995

[54] INJECTION PRODUCT FOR FINE SANDS AND OTHER POROUS MATTER

[75] Inventor: Claude Caron, Aix en Provence, France

[73] Assignee: GEATEC, Venelles, France

[21] Appl. No.: 13,216

[22] Filed: Feb. 1, 1993

Related U.S. Application Data

[63] Continuation of Ser. No. 796,260, Nov. 19, 1991, abandoned.

Foreign Application Priority Data

Nov. 20, 1990 [FR] France ................ 90 14435

[51] Int. Cl.⁶ ............................................. C04B 12/04
[52] U.S. Cl. ................... 106/606; 106/600; 106/608; 106/634; 106/785
[58] Field of Search ............ 106/600, 606, 612, 620, 106/624, 714, 785, 634; C04B 40/00, 12/04, 7/06

[56] References Cited

U.S. PATENT DOCUMENTS

| | | | |
|---|---|---|---|
| 2,509,599 | 5/1950 | Hollenberg | 106/612 |
| 3,294,563 | 12/1966 | Williams | 106/600 |
| 3,853,571 | 12/1974 | Gellman | 106/606 |
| 4,761,183 | 8/1988 | Clarke | 106/714 |

OTHER PUBLICATIONS

Japanese Patent Abstract –"Process for Stabilizing Soil" Yoshinari et al. (Oct. 27, 1983) 58-132077.

*Primary Examiner*—Mark L. Bell
*Assistant Examiner*—Paul Marcantoni
*Attorney, Agent, or Firm*—Armstrong, Westerman, Hattori, McLeland & Naughton

[57] ABSTRACT

An injection product for fine sands and other porous matter. This product comprises, on the one hand, cement and an alkaline silicate and, on the other hand, an agent inhibiting the reaction between the above two constituents. Application is in the field of construction.

3 Claims, No Drawings

INJECTION PRODUCT FOR FINE SANDS AND OTHER POROUS MATTER

This application is a continuation of application Ser. No. 07/796,260 filed Nov. 19, 1991, now abandoned.

The present invention relates to an injection product for fine sands and other porous matter such as, for example, permeable rocks or damaged masonry. This product has, especially, the aim of permitting the impermeability and/or the strengthening of soils and construction materials.

The finer the ground material, the more fluid the injection product or grouting must be this allows three types of grouting to be defined in the field of sands or other porous media of fine matter:
bentonite-cement grouting for coarse sands
silica gel for fine to medium sands
aqueous resin for slimy sands and silts.

Amongst these products, silica gel is the least satisfactory grouting because it is reversible to a high degree and is consequently a long-term pollutant.

Also, one has wished to shift the limit of injectability of the bentonite-cement groutings towards the average and fine sands. This has been made possible with the appearance on the market of ultra-fine cements, the mean grain size of which is 3 microns instead of 20 microns for the normal cements. Such ultra-fine cements are sold in particular by the companies ONODA, HOLDERBANK and LAFARGE under the commercial names ONODA MC, SPINOR and LANCO 727 respectively.

In order that these ultra-fine cements actually remain ultra-fine, they must be prevented from flocculating, either by physical means (ultrasonics), or by chemical means (addition of an anti-flocculant).

If these ultra-fine binders are used in a conventional manner, i.e., in the condition of stable bentonite-cement groutings, the result is not totally interesting, because two causes prevent the penetration of the bentonite-cement groutings in the fine and medium sands, the coarseness of the grains of cement and the viscosity/rigidity of the mixture. By reducing the coarseness of the grains of cement, only the first cause is treated. To have a grouting which performs totally, its viscosity/rigidity must also be reduced and for this, the bentonite must be omitted. Thus, one arrives at a mixture which is almost as fluid as water.

Such mixtures, which are very fluid and thus very penetrating, have been described by Messrs. Masao SHIMODA and Hiroshi OHMORY of the Japanese company ONODA in the article "Ultra Fine Grouting Material", (Grouting Geotechnical Engineering, ASCE Conference New Orleans 1981). Used at dosages of between 200 and 400 kg/m$^3$, the ultra-fine cement sold under the name ONODA MC injected into fine sands gives the latter a strength of 0.7 MPa (for 200 kg of cement) to 3.3 MPa (for 400 kg of cement). Substantially equivalent results have been found by using the other above-mentioned ultra-fine cements.

Such mixtures without bentonite have a decantation of at least 60%, so that they are unable to ensure that the medium which is treated is made impervious. That is the upper part of the pores filled with grouting on injection will be constituted by the decantation water after a few hours.

To remedy this major disadvantage, the ONODA company recommends the addition of sodium silicate ($Na_2SiO_3$) which ensures a solidification of the mixture before the cement has been able to sediment.

Since the reaction of the silicate on the cement is produced in less than two minutes, i.e. almost instantaneously, the silicate must be introduced at the last moment that is on penetration of the grouting into the ground. This is possible by using a double dosing pump followed by a double pipe, itself followed by boring equipment comprising two annular tubes ending in a mixing chamber perpendicular to the passage in which the grouting is to be injected. Such a method, although it performs its function, is extremely delicate to put into operation.

To make the silicate-cement reaction less rapid, i.e., so that the latter is not completed before 20 to 80 minutes, which permits the use of a conventional injection method, the company SOLETANCHE has described in the document EP-A-0,336,825 an injection product in which the sodium silicate is replaced by a liquor of silica comprising fumes of silica and soda of a higher basicity ($SiO_2/Na_2O$ less than 2, whereas this ratio is higher than 2 for commercial silicates). This liquor of silica, which contrary to the commercial silicates is free of colloidal silica, reacts sufficiently slowly with the cement if the latter is a slag cement. Nevertheless, this injection product presents two disadvantages that is: it requires the use, on the one hand, of a special silicate which is not on sale, and, on the other hand, the use of a slag cement to the exclusion of any other cement.

The two types of injection product described above, which have the aim of allowing fine sands or other porous materials of low permeability to be made impermeable and/or strengthened, are limited either to a technique which is delicate to implement, or to base constituents which are not on sale commercially.

Also, the present invention has the aim, in particular, of providing an injection product for fine sands and other porous matter in order to allow them to be made impermeable and/or strengthened, which offers a sufficiently long setting time for them to be injected by using the conventional methods, and the constituents of which are commercially available.

Another aim of the present invention is to provide such a product of simple manufacture and having a relatively low cost price.

These aims, and also others which will become apparent hereinafter, are attained by an injection product for fine sands and other porous matter comprising cement, an alkaline silicate, and an agent inhibiting the reaction of the two constitutents with each other, which is selected from the products which form with lime (CaO) a compound which is less soluble than lime itself, and which are constituted by the acid or alkaline salts of one of the following mineral or organic acids: carbonic, boric, phosphoric, tartaric, citric, malonic, malic, succinic, oxalic, which product is, according to the present invention, characterised in that the weight ratio of silicate-cement is greater than 1, and that it comprises from 20 to 2000 kg/m$^3$ of inhibiting agent.

Advantageously, the weight ratio of silicate-cement is comprised between 1.5 and 3.5.

As the specialist in the art knows, the principal constituent of cement is tricalcium oxide silicate $SiO_2,3CaO$ (abbreviated to $C_3S$), the free or immediately hydrosoluble CaO of which reacts instantaneously on the alkaline silicate by precipitating it in the form of mono-or bicalcium oxide silicate. Then, in the next minute, the crystals thus formed bring about the crystallisation of the entire tricalcium oxide silicate ($C_3S$). This property is utilised to obtain cements which set almost instantaneously, which are used in particular in the provision of gunite or to block an inrush of water. On the other hand, in the case of the injection of sands, this primary instantaneous reaction of the alkaline silicate on free or hydrolysed lime (CaO) must be prevented. In order to reach this aim, according to the invention an inhibiting agent is used which reacts on the soluble CaO (free or hydrolysed) on two occasions:

firstly, the CaO reacts with this inhibiting agent in order to create a compound, the solubility of which is less than that of lime (CaO), 1.2 g/l. This first reaction does not involve any setting of the mixture.

secondly, this compound, which is scarcely soluble, obtained above, enters into reaction with the alkaline silicate to form crystals of monocalcium oxide silicates which bring about the mass setting of the grouting. This second reaction occurs a few tens of minutes after the first reaction.

Thus, instead of having the direct and instantaneous reaction $CaO + SiO_3Na_2 \rightarrow SiO_3Ca$, one will have the succession of the following two reactions, in which A represents the inhibiting agent.

$$CaO + A \rightarrow ACa \text{ (scarcely soluble)}$$

$$ACa + SiO_3Na_2 \rightarrow SiO_3Ca$$

This second reaction takes place as the compound ACa dissolves.

The inhibiting agent must therefore be selected from the products formed with lime (CaO) a compound which is less soluble than lime itself. Such products are constituted in particular by the acid or alkaline salts of one of the following mineral or organic acids: carbonic, boric, phosphoric, tartaric, citric, malonic, malic, succinic, oxalic, . . .

The first reaction ($CaO + A \rightarrow ACa$) is obtained with all the cements, whatever their nature that is either those of Portland base, such as those sold under the commercial names ONODA MC, LANCO 727 or those SPINOR E, or of slag base, such as those sold under the commercial names SPINOR A or 1, 2, 3. Of course, a mixture of these two types of cement may be used, or lime may be added to them, because it may be as fine as an ultra-fine cement.

As the hardening and the final strength are affected to a slight extent by the pH of the medium, it will be taken into account in the choice of the inhibiting agent that is a more basic medium is more favourable to hardening in slag-based cements than in those of Portland base. For example, a trisodium phosphate is used as inhibiting agent for a slag-based cement and a disodium phosphate is used for a Portland-based cement.

The second reaction $$(ACa + SiO_3Na_2 \rightarrow SiO_3Ca)$$

is obtained whenever the commercial alkaline silicate used and whatever, in particular, the ratio of $SiO_3/Na_2$ or CaO, is 2 to 4 for the current range. As set forth previously, one must take into account the greater or lesser basicity of the alkaline silicate for the choice of the inhibiting agent A that is the latter should therefore be more basic in the case of a silicate with a low content of alkalis and vice versa.

Contrary to the teaching of the prior art, in particular the document EP-A-0,336,825, in accordance with the present invention one may use the silicate at a high dose that is more silicate than cement. As the silicate takes part in the final strength of the mixture, this allows one, for the same strength, to greatly reduce the dosage of ultra-fine cement. This leads to a better injectability and a definite saving. As explained above, doses of ultra-fine cement comprised between 200 and 400 kg/m$^3$ are required in order to obtain a strength comprised between 0.7 and 3.2 MPa. On the other hand, the product according to the present invention comprises from 85 to 170 kg/m$^3$ of ultra-fine cement to obtain the same range of strength.

If one uses injection products comprising from 200 to 400 kg/m$^3$ of ultra-fine cement, one will obtain groutings having a strength greater than 5 MPa. These groutings are not often used for the injection of sands, but are used for the strengthening and regeneration of damaged masonry. At such proportions of ultra-fine cement, it may be necessary for the injection product also to comprise a deflocculation agent.

The following examples, which are in no way restrictive, have the sole purpose of allowing the present invention to be better understood.

EXAMPLE 1

A high consolidation grouting is produced with an ultra-fine cement of slag base, such as those sold by the company HOLDERBANK under the names SPINOR 1 or SPINOR A.

The composition of the injection product per m$^3$ is

| | |
|---|---|
| water | 630 l |
| slag-based cement | 200 kg |
| trisodium phosphate | 33 kg |
| inhibiting agent: sodium oxalate | 5 kg |
| silicate of soda 43° B. ($SiO_2/Na_2O = 2.7$) | 400 kg |

This injection grouting has a strength higher than 4 MPa.

EXAMPLE 2

A high consolidation injection grouting is produced with an ultra-fine cement of Portland base, such as that sold by the company HOLDERBANK under the commercial name SPINOR E, or by the company ONODA under the commercial name ONODA MC or else by the company LAFARGE under the commercial name LANCO 727.

The composition of the injection product per m$^3$ is

| | |
|---|---|
| water | 610 l |
| Portland based cement | 200 kg |
| disodium phosphate | 44 kg |
| inhibiting agent: sodium oxalate | 8 kg |
| silicate of soda 43 Be ($SiO_2/Na_2O = 3.2$) | 400 kg |

This injection grouting has a strength higher than 4 MPa.

EXAMPLE 3

A semi-consolidation injection grouting is produced with an ultra-fine cement of slag base such as those sold by the company HOLDERBANK under the commercial names SPINOR 1 or SPINOR A.

The composition of the injection product is:

| | |
|---|---|
| water | 770 l |
| slag based cement | 100 l |
| trisodium phosphate | 9 kg |
| disodium phosphate | 7 kg |
| inhibiting agent: sodium oxalate | 3 kg |
| silicate of soda at 41 Be (SiO$_2$/Na$_2$O = 3.2) | 270 kg |

This injection grouting has a strength comprised between 1 and 1.5 MPa.

EXAMPLE 4

A high consolidation injection grouting is produced with an ultra-fine cement of Portland base such as that sold by the company HOLDERBANK under the commercial name SPINOR E or by the companies ONODA and LAFARGE under the commercial names ONODA MC and LANCO 727, respectively.

The composition of the injection product is:

| | |
|---|---|
| water | 765 l |
| SPINOR E cement | 100 kg |
| inhibiting agent: sodium tartrate | 20 kg |
| silicate of soda at 39° B2 (SiO$_2$/Na$_2$O = 3.3) | 260 kg |

This injection grouting has a strength comprised between 1 and 1.5 MPa.

I claim:

1. A batch injection product adapted to be directly injected into sands; and other porous matter, the product consisting essentially of a mixture of cement, an alkaline silicate, water and an agent inhibiting the reaction of the cement and the alkaline silicate with each other, the agent forming a compound with lime (CaO) which is less soluble than lime itself, and comprising an acid or alkaline salt of one of the following mineral or organic acids selected from the group consisting of carbonic, boric, phosphoric, tartaric, citric, malonic, malic, succinic, oxalic acids, wherein the weight ratio of silicate to cement is greater than 1 and wherein the product comprises from 20 to 200 kg inhibiting agent per m$^3$ product.

2. An injection product according to claim 1, wherein the weight ratio of silicate to cement is between 1.5 and 3.5.

3. An injection product according to claim 1, wherein the product comprises from 85 to 400 kg cement per weight m$^3$ product.

* * * * *